(12) United States Patent
Marin et al.

(10) Patent No.: US 10,536,262 B2
(45) Date of Patent: Jan. 14, 2020

(54) ELECTRONIC GENERATION DEVICE

(71) Applicant: KONINKLIJKE PHILIPS N.V., Eindhoven (NL)

(72) Inventors: Leandro Marin, Eindhoven (NL); Alphons Antonius Maria Lambertus Bruekers, Nederwert (NL); Paulus Mathias Hubertus Mechtildus Gorissen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 77 days.

(21) Appl. No.: 15/529,558

(22) PCT Filed: Dec. 11, 2015

(86) PCT No.: PCT/EP2015/079489
§ 371 (c)(1),
(2) Date: May 25, 2017

(87) PCT Pub. No.: WO2016/092097
PCT Pub. Date: Jun. 16, 2016

(65) Prior Publication Data
US 2017/0324546 A1    Nov. 9, 2017

(30) Foreign Application Priority Data
Dec. 12, 2014    (EP) .................................... 14197524

(51) Int. Cl.
*H04L 29/06*    (2006.01)
*H04L 9/00*    (2006.01)
*H04L 9/30*    (2006.01)

(52) U.S. Cl.
CPC .............. *H04L 9/008* (2013.01); *H04L 9/002* (2013.01); *H04L 9/3033* (2013.01); *H04L 2209/16* (2013.01)

(58) Field of Classification Search
None
See application file for complete search history.

(56) References Cited

U.S. PATENT DOCUMENTS 4,418,394 A    11/1983    Tai
4,949,294 A    8/1990    Wambergue
(Continued)

FOREIGN PATENT DOCUMENTS

EP    1876577 A1    9/2008
JP    2011513787 A    4/2011
(Continued)

OTHER PUBLICATIONS

Aspire Advanced Software Protection: Integration, Research and Exploitation; "Early White-Box Cryptography and Data Obfuscation Report"; Project No. 609734, Oct. 2014, 64 Page Document.
(Continued)

*Primary Examiner* — Malcolm Cribbs (57) ABSTRACT

An electronic generation device arranged to generate parameters for digital obfuscated arithmetic including a prime number unit arranged to generate a prime modulus (p) and a base element unit arranged to generate a prime modulus and a base element such that each ring-element modulo the prime modulus may be expressed as a difference between two powers of the potential base element.

14 Claims, 4 Drawing Sheets

(56) References Cited

U.S. PATENT DOCUMENTS

| | | | |
|---|---|---|---|
| 5,069,547 A | 12/1991 | Huggins et al. | |
| 5,270,956 A | 12/1993 | Oruc et al. | |
| 6,760,742 B1 | 7/2004 | Hoyle | |
| 7,434,898 B2 | 10/2008 | Futa et al. | |
| 8,479,018 B2 * | 7/2013 | Futa | G06F 21/14 713/190 |
| 8,595,513 B2 | 11/2013 | Adjedj | |
| 8,670,559 B2 | 3/2014 | Michiels et al. | |
| 9,288,039 B1 * | 3/2016 | Monet | H04L 9/008 |
| 2003/0044004 A1 * | 3/2003 | Blakley | G06F 7/72 380/28 |
| 2004/0139340 A1 | 7/2004 | Johnson et al. | |
| 2005/0002532 A1 * | 1/2005 | Zhou | H04L 9/302 380/277 |
| 2007/0012604 A1 | 6/2007 | Moharir et al. | |
| 2008/0208560 A1 | 8/2008 | Johnson et al. | |
| 2009/0228717 A1 | 9/2009 | Futa et al. | |
| 2011/0010141 A1 | 1/2011 | Jabir | |
| 2011/0246787 A1 * | 10/2011 | Farrugia | G06F 21/60 713/189 |
| 2013/0329883 A1 * | 12/2013 | Tamayo-Rios | H04L 9/008 380/28 |
| 2014/0006605 A1 | 1/2014 | Frei et al. | |
| 2014/0095772 A1 | 4/2014 | Lee et al. | |
| 2015/0067874 A1 | 3/2015 | Johnson et al. | |
| 2015/0186627 A1 | 7/2015 | Teuwen et al. | |
| 2015/0215123 A1 * | 7/2015 | Kipnis | H04L 9/008 380/46 |
| 2017/0109539 A1 | 4/2017 | Kinasz | |
| 2017/0220320 A1 | 8/2017 | Marin et al. | |
| 2017/0324544 A1 | 11/2017 | Marin et al. | |

FOREIGN PATENT DOCUMENTS

| | | |
|---|---|---|
| JP | 2012129993 A | 7/2012 |
| RU | 2467389 C | 11/2012 |
| SU | 1667059 A2 | 7/1991 |
| WO | 02067108 A2 | 8/2002 |
| WO | 2004112307 A2 | 12/2004 |
| WO | 2006117769 A2 | 11/2006 |
| WO | 2009076669 A1 | 6/2009 |
| WO | 2013088066 A1 | 6/2013 |
| WO | 2014016795 A2 | 1/2014 |
| WO | 2016050884 A1 | 4/2016 |

OTHER PUBLICATIONS

Chow et al: "White-Box Cryptography and an AES Implementation"; LNCS 2595, pp. 250-207, 2003.

Dardaillon et al: "Hardware Implementation of the GPS Authentication"; IEEE 2012, pp. 1-6.

Kerl: "Computation in Finite Fields"; Arizona State University and Lockheed Martin Corporation, Apr. 2004, 90 Page Document.

Wikipedia; "Lattice Multiplication" Document Downloaded From https://en.wikipedia.org/wiki/Lattice_multiplication, last updated on Apr. 24, 2017, 3 page document.

Zhu et al: "A Provable Scheme for Homomorphic Obfuscations in Software Security"; Proceedings of the IASTED International Conference on Communication, Network, and Information Security, Jan. 2006, pp. 1-5.

Omondi et al: "Residue Number Systems, Theory and Implementation"; Advances in Computer Science and Engineering:Tests, vol. 2, Published by Imperial College Press, 2007.

* cited by examiner

ELECTRONIC GENERATION DEVICE

CROSS-REFERENCE TO PRIOR APPLICATIONS

This application is the U.S. National Phase application under 35 U.S.C. § 371 of International Application No. PCT/EP2015/079489, filed on Dec. 11, 2015, which claims the benefit of European Patent Application No. 14197524.3, filed on Dec. 12, 2014. These applications are hereby incorporated by reference herein.

FIELD OF THE INVENTION

The invention relates to an electronic generation device, an electronic generation method, a computer program, and a computer readable medium.

BACKGROUND OF THE INVENTION

In white-box cryptography and more in general software obfuscation, computations are often performed on encoded values instead of plain values. Reverse engineering of the obfuscated software is harder if computations are performed on encoded values, instead of on the plain values themselves.

After the encoding, regular operations, like addition or multiplication, can no longer be performed using a computer's built-in primitives. The straightforward addition of encoded values does not normally result in the encoding of the addition of the values. The same holds for multiplication. In a formula: $E(x)+E(y) \neq E(x+y)$, for most x and y; E denotes the encoding function.

A solution to this problem is to introduce addition (A) and multiplication (M) tables. The tables take two encoded values as input and produce an encoded value as output that corresponds to the encoding of the addition or multiplication operation. The tables may be defined as: $A(E(x), E(y))=E(x+y)$; $M(E(x), E(y))=E(xy)$. These tables allow arithmetic to be performed directly on encoded values.

The obfuscated addition and multiplication using tables suffers from at least two drawbacks. First, the tables can become quite large. If x and y are represented as l bits, each table needs $2^{2l}l$ bits.

Second, such large tables may be easily found in software. Worse, the tables might still be identified as addition or multiplication operations even though they are encoded; for example, through properties of these functions that are preserved in the encoding. For example, the multiplication table satisfies $M(E(0), E(x))=E(0)$. An attacker may use this and similar properties to guess which operation the tables represent.

SUMMARY OF THE INVENTION

In a previous application by the same applicant an improved way to perform obfuscated arithmetic was presented. The previous application was filed with the European Patent Office (EPO) under title "Electronic calculating device for performing obfuscated arithmetic", Filing date: 30 Sep. 2014, Application nr: 14186951.1. The previous application is included herein by reference in its entirety, and in particular also for its description of calculation device using homogenous obfuscation over an integer ring.

The inventors had found that in some cases multiplication and addition on encoded values may be performed using a single table without having to encode multiple values into a single encoded value. Because the same table is used for addition and multiplication it would be hard to see during reverse engineering if an addition or a multiplication is performed. Because addition and multiplication appear to be the same operation when viewed from the outside, the inventors have termed this method 'homogenous obfuscation'. Even if an attacker were able to find the table that is used, and even if he were able to figure out somehow its function as an increment table, he still would not know whether addition or multiplication operations are performed. The way the table acts on element of the integers list, will differ for addition and multiplication, however this may be easily hidden using traditional obfuscation.

In addition, the single table that is used is also smaller than the one discussed in the background: approximately $2^l l$ bits are needed. Even if only addition is used, the table needed for obfuscated addition is smaller than the table suggested in the background.

For example, a ring element may be encoded as two integers (a, b). Arithmetic can be performed directly on the encoding using an increment table that maps an encoded ring element to the encoded ring element plus an increment value. For example, the table may map (a, b) to (c, d) if $u^c - u^d = u^a - u^b + 1$. Both the addition and multiplication are performed by repeated applications of the increment table.

The obfuscated arithmetic applies to many different commutative rings R, although not each and every ring allows encoding as integer lists. Commutative rings are a mathematical concept that includes many different familiar mathematical structures, e.g., the integers modulo a number ($\mathbb{Z}_n$). A generation device according to the claims may be used to generate parameters for digital obfuscated arithmetic, the parameters defining a commutative ring ($\mathbb{Z}_n$) having a finite number of ring-elements, a base element (u) being comprised in the ring elements, such that each ring-element may be expressed as a difference between two powers of the base element ($u^{a_1} - u^{a_2}$). A modulus n defines a commutative ring as the integer module the modulus n.

The effective generation of integer rings that allow homogenous obfuscation allows different types of rings to be used in calculation device thus increasing obfuscation.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer In a preferred embodiment, the computer program comprises computer program code means adapted to perform all the steps of a method according to the invention when the computer program is run on a computer. Preferably, the computer program is embodied on a computer readable medium.

BRIEF DESCRIPTION OF THE DRAWINGS

These and other aspects of the invention are apparent from and will be elucidated with reference to the embodiments described hereinafter. In the drawings, FIG. 1a schematically shows an example of an embodiment of an electronic generation device, FIG. 1b schematically shows an example of an embodiment of an electronic generation device, FIG. 2 schematically shows an example of an embodiment of an electronic generation method 200, FIG. 3 schematically shows an example of an embodiment of an electronic method 300 verifying whether each ring-element may be expressed as a difference between two powers of the potential base element, FIG. 4 schematically shows an example of an embodiment of an electronic generation method 400.

Items which have the same reference numbers in different figures, have the same structural features and the same functions, or are the same signals. Where the function and/or structure of such an item has been explained, there is no necessity for repeated explanation thereof in the detailed description.

DETAILED DESCRIPTION OF EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

In the following, for sake of understanding, elements of embodiments are described in operation. However, it will be apparent that the respective elements are arranged to perform the functions being described as performed by them.

In the previous application cited above examples are given of an embodiment of a calculating device for performing obfuscated arithmetic in a commutative ring. The calculating device is an electronic device for performing obfuscated arithmetic in a finite commutative ring. One example that was given of such rings is the integers modulo a number ($\mathbb{Z}_n$). The generation device according to an embodiment finds a modulus such that the ring formed by the integers modulo that modulus ($\mathbb{Z}_n$) allows for obfuscated arithmetic. A base element needed to encode and decode ring elements, e.g., integers, in and out of the obfuscated domain is also generated.

Homogenous obfuscation, e.g., representing ring elements, in particular integers modulo a modulus is a type of encrypted arithmetic; sometimes also referred to as homomorphic encryption. Using obfuscation, e.g., computer software code is protected against reverse-engineering of the code. The obfuscation here is of the part of the code that performs arithmetic. In an embodiment of the digital obfuscated arithmetic computations may be carried out on ciphertext and generate an encrypted result which, when decrypted, matches the result of operations performed on the plaintext. In other words, going beyond some traditional software obfuscation, arithmetic may be executed on encrypted values. Nevertheless, arithmetic implement using homogenous obfuscation may be functionally identical to arithmetic performed on plain values.

The elements of the ring may be defined as the integers modulo the modulus. The elements of the ring are referred to as ring elements. The ring elements may also be called residues. A ring element may be digitally represented as an integer between 0, and the modulus minus 1; 0 and the modulus minus 1 being included. On the ring elements an addition and a multiplication is defined, the latter are referred to as the ring-addition and the ring-multiplication.

Ring elements may be represented in any suitable form, should that be needed. For example, elements of $\mathbb{Z}_n$ may be represented as integers. However, in the calculation device, ring elements are represented as integer-lists. For example, a ring element a may be represented in the calculation device by a list $(a_1, a_2)$. An integer-lists encodes a ring-element according to some mapping between ring elements and integers list; given any ring-element there is at least one integer list that represents the ring-element, and given any integer list, there is exactly one ring element that it represents. In embodiments any ring element may be represented as an integer list.

The integer lists have at least two elements. As it turns out, the addition and multiplication operations require fewer steps if the integer list is shorter. Accordingly, in an embodiment the integer lists always have two elements. In the main description we will assume that the integer lists are integer pairs, however, examples of integer lists having more than two elements are provided. As an example, the $(a_1, a_2)$ may map to the ring element $(u^{a_1}-u^{a_2})$, wherein u is a special ring element, referred to as a base ring element. Many variants are discussed in the previous application, including using multiple base elements. However in the main discussion we will assume as 'the example encoding' that a given integer list $(a_1, a_2)$ maps to the ring element $(u^{a_1}-u^{a_2})$. Each ring element can thus be expressed as a difference between two powers of the base element u.

Below a number of examples of obfuscated arithmetic using a modulus and base element, e.g., as generated by a generation device according to an embodiment, are presented. Examples are given of encodings, increment tables, ring addition methods and ring multiplication methods. The negation, addition and multiplication units of the calculation device may be configured for any of these embodiments. All examples apply to the commutative ring $\mathbb{Z}_n$. Herein is n a positive integer modulus. Any element of the commutative ring may be represented in the chosen encoding. Not all commutative rings allow all elements to be represented in a given encoding, e.g., as a given type of integer list representation. Given a commutative ring R we will say that it allows (full) homogenous obfuscation if any element in R may be represented as an integer list using a given encoding type. The person skilled in the art can verify if a given commutative ring allows full homogenous obfuscation given an encoding, e.g., by generating all allowable encodings and verifying that together they represent all elements of a given ring.

Below first a description is given of the example encoding. There are many types of encodings, which have in common that ring elements may be represented as lists of integers. These integers are not ring elements, e.g., even if the ring is not an integer ring say a polynomial ring, then nevertheless elements may be represented as integer lists. The encoding used, how a given integer list maps to a ring element is referred to as the encoding. Typically, the integer lists will always be of the same length, however this is not necessary. Generally, as the encoding allows more types of integer lists, e.g., longer lists, it becomes more likely that a given ring element may be encoded as an integer list in different ways.

Given a commutative ring R with the example encoding, there is a special ring element u, such that any element a of R may be written as $u^{a_1}-u^{a_2}$, for some integers $a_1$ and $a_2$. We refer to such a special ring element as a base ring element.

Not all commutative rings may be encoded in this manner, but sufficiently many of them are for the encoding to be useful. The integers $a_1$ and $a_2$ are not themselves ring elements of ring R; they are integers operated upon modulo the order of the base element. Note that that the ring element a equals a linear combination of powers of the base element u, namely of $u^{a_1}$ and $u^{a_2}$; in this case the linear combination is obtained by multiplying the powers with +1 or −1 and summing them, more in particular, by subtracting a second power from a first power. The calculating device operates on ring elements encoded in the above fashion. The addition, negation and multiplication units can operate on ring elements in this encoding.

An increment table T plays a central role both in the addition and multiplication operation. The increment table maps an input ring element, in this case an input ring element may be represented as an integer list. For example, given an input integer list $(k_1, k_2)$ representing the input ring element $k = u^{k_1} - u^{k_2}$ the table T maps this to an output integer-list, e.g. $T((k_1, k_2)) = (l_1, l_2)$ encoding an output ring element $l = u^{l_1} - u^{l_2}$. The output ring element equals the increment ring element ring-added to the input ring element. In this example, the increment element may be taken as 1, i.e., the ring element which is the identity for the ring multiplication; in this case $l = k + 1$. It is convenient that the table may be applied directly to ring elements which use the same encoding, and thus which may be applied to ring elements having the integer list representation. Nevertheless, there are embodiments, in which the table is applied to ring elements in an alternative encoding. The alternative encoding may also be an integer list, but of an alternative type. Also the increment ring element need not be 1.

Below the operations, negation, addition, and multiplication are described.

Negation.

Given a negation-input integer-list $(a_1, a_2)$ representing the negation input ring element $a = u^{a_1} - u^{a_2}$, a negation-output integer-list may be obtained by permuting the integer list, in this case by reversing the order. The negation-output integer-list may be $(a_2, a_1)$. Assuming that there exists an m, such that $u^m = -1$, which happens base elements with an even order, the negation may alternatively be obtained by adding a constant, e.g. m, to each integer of the integer list. In the latter case the negation-output integer-list may be $(a_1+m, a_2+m)$. This works since $-a = u^{a_2} - u^{a_1} = u^{a_1+m} - u^{a_2+m}$. Arithmetic in the integer list is preferably done modulo the order of the base element. Here, an integer of the integer lists corresponds to an exponent of the base element, so integers that are the same module the order of the base element encode the same ring element.

Addition.

To add received first addition-input integer-list $(a_1, a_2)$ encoding a first addition-input ring element $a = u^{a_1} - u^{a_2}$ and a second addition-input integer list $(b_1, b_2)$ encoding a second addition-input ring element $b = u^{b_1} - u^{b_2}$ first an intermediate addition integer-list $((c_1, c_2))$ encoding an intermediate addition ring element c is determined.

The ring element c may be the first addition-input ring element a plus the base element u to a power determined from the second addition input integer list, in particular a first integer of the second addition input integer list. In this example, we may have $c = u^{a_1} - u^{a_2} + u^{b_1}$. To compute the latter we observe that $c = u^{a_1} - u^{a_2} + u^{b_1} = (u^{a_1-b_1} - u^{a_2-b_1} + 1) u^{b_1}$. The term in brackets may be rewritten in the encoding using the increment table. Through a first application of the increment table to the ring element $u^{a_1-b_1} - u^{a_2-b_1}$ an element $u^{d_1} - u^{d_2} = u^{a_1-b_1} - u^{a_2-b_1} + 1$ is obtained. For example, by $T((a_1-b_1,$ $a_2-b_1)) = (d_1, d_2)$. We then have that $c_1 = d_1 + b_1$ and $c_2 = d_2 + b_1$, thus determining the intermediate addition integer-list $((c_1, c_2))$ may further comprise adding an integer determined from the second addition-input integer-lists to the integers in the integer-list resulting from first application. Adding $u^{b_1}$ to a ring element in integer list representation, in this case, to a, is sometimes referred to as the positive reduction step.

Thus the addition unit has obtained intermediate addition ring element $c = u^{a_1} - u^{a_2} + u^{b_1} = u^{c_1} - u^{c_2}$, as the integer-list $(c_1, c_2)$. The intermediate addition ring element is thus a linear combination of powers of one or more base elements wherein the powers are determined from the first and second addition-input integer-lists. In this case the increment table is applied to the ring-element $u^{a_1-b_1} - u^{a_2-b_1}$ formed by the one or more base ring elements (u) raised to the power of a first integer of the first integer list $(a_1)$ minus a first integer of the second integer list $(b_1)$ minus the base ring element (u) raised to the power of a second integer of the first integer list $(a_2)$ minus the first integer of the second integer list $(b_1)$.

In this example, the addition-output integer-list may be determined through a second application of the increment table to ring elements determined from the intermediate addition integer-list and the second addition-input integer-list. This may comprise computing the sum of intermediate addition ring element c and minus the base element raised to a power determined from the second addition input integer list, e.g. the second integer of the second addition input integer list $b_2$: $c - u^{b_2} = u^{c_1} - u^{c_2} - u^{b_2}$. This may be accomplished by negating the intermediate addition ring-element represented by the intermediate addition integer-list before the second application of the increment table. The negating of c may be done as indicated above. As an example we use permuting, but the same operation may be performed by adding a constant to the exponent. After negating, the sum may use plus (instead of minus) the base element raised to a power determined from the second addition input integer list: $c + u^{b_2} = u^{c_2} - u^{c_1} + u^{b_2}$. The latter operation is of the same type as above, and can be performed through a table application in the same manner as adding $u^{b_1}$. After this the result is negated again. The full addition may use two negations and two table applications, of the same increment table T.

Subtracting $-u^{b_2}$ from a ring element in integer list representation, in this case from c, is sometimes referred to as the negative reduction step. The negative reduction step may be performed by negating, performing the positive reduction step, and negating again.

Multiplication.

To multiply the received first multiplication-input integer-list $(r_1, r_2)$ encoding a first multiplication-input ring element $r = u^{r_1} - u^{r_2}$ and a second multiplication-input integer list $((s_1, s_2))$ encoding a second multiplication-input ring element $s = u^{s_1} - u^{s_2}$, a first intermediate multiplication integer-list $(t_1, t_2)$ and a second intermediate multiplication integer-list $(u_1, u_2)$ are determined. A multiplication-output integer-list encoding a multiplication-output ring element is determined from the first and second intermediate element. In other embodiments, there may be more than two intermediate multiplication integer lists. We have that $r \cdot s = (u^{r_1} - u^{r_2})(u^{s_1} - u^{s_2}) = u^{r_1+s_1} - u^{r_1+s_s} + u^{r_2+s_2} - u^{r_2+s_1} = (u^{r_1 s_1} - u^{r_1+s_2}) + (u^{r_2+s_2} - u^{r_2 s_1}) = t + u$. Partitioning the terms in the expanded products over two terms t and u may be done in different ways, e.g., as $(u^{r_1 s_1} - u^{r_2+s_1}) + (u^{r_2+s_2} - u^{r_1+s_2})$.

Thus to multiply two ring elements represented as integer lists they may be transformed into two new integer lists that can be added to obtain the answer to the multiplication. The addition may be done as described above. For example, the multiplication unit may compute the intermediate integer lists and send them to the multiplication unit.

For example, a first integer $t_1$ of the first intermediate multiplication integer-list may comprise a first integer $r_1$ of the first multiplication-input integer-list plus a first integer $s_1$ of the second multiplication-input integer-list, and a second integer $t_2$ of the first intermediate multiplication integer-list may comprise a first integer $r_1$ of the first multiplication-input integer-list plus a second integer $s_2$ of the second multiplication-input integer-list $t_1=r_1+s_1$, $t_2=r_1+s_2$; A first integer $u_1$ of the second intermediate multiplication integer-list may comprise a second integer $r_2$ of the first multiplication-input integer-list plus a second integer $s_2$ of the second multiplication-input integer-list, and a second integer $u_2$ of the second intermediate multiplication integer-list may comprise a second integer $r_2$ of the first multiplication-input integer-list plus a first integer $s_1$ of the second multiplication-input integer-list $u_1=r_2+s_2$, $u_2=r_2+s_1$, In an embodiment, e.g., in the example just disclosed, the arithmetic is performed on integer lists, the ring elements do not need to be calculated as ring elements in some natural representation. Now a number of the variants are discussed. Many of the variants are independent, e.g., a variant encoding may be combined with a variant to perform addition.

Through the obfuscated arithmetic when calculations are performed in the integer list, corresponding e.g. to $u^{a_1-b_1}$, etc, the value may be reduced modulo the order of u. For example, if the order of u is 30, all computations may be performed mod 30.

Figure 1A:
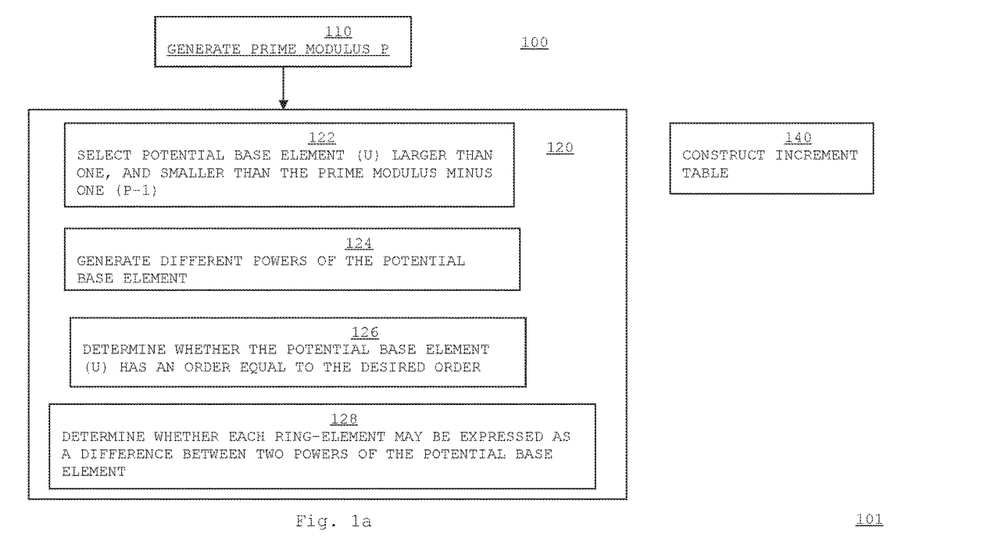

FIG. 1a schematically shows an example of an embodiment of an electronic generation device 100. Electronic generation device 100 is arranged to generate parameters for digital obfuscated arithmetic. The parameters may comprise a modulus and a base element. The modulus defines a commutative ring ($\mathbb{Z}_n$) having a finite number of ring-elements. The base element (u) is comprised in the ring elements, such that each ring-element may be expressed as a difference between two powers of the base element ($u^{a_1}-u^{a_2}$). The residues modulo the modulus are ring elements. For example, the ring element may be representative of the integers from 0 up to and including the modulus minus 1.

The generation device 100 generates a modulus and base element such that the base element has a desired order k modulo the modulus n. For example, device 100 may have an interface, e.g., an input, for receiving a desired order, or the desired order may be predetermined in the generation device, etc. The order determines the size of the so-called increment table and is thus an important parameters that is often selected by the designer of a cryptosystem beforehand. Using an embodiment the designer can find out if there exist corresponding moduli and base element for a desired order. For example, the interface may be an API (application programming interface). In an embodiment, the desired order is chosen before choosing the prime modulus.

Generation device 100 comprises a prime number unit 110 arranged to generate a prime modulus p. The prime modulus is less than the square of the desired order (k; order(u)=k) of the base element ($k^2>p$). There can be at most $k^2$ different integer list of two powers of the base element. If all ring elements are to be represented in this way, we need to have that ($k^2>p$). On the other hand the prime number should be larger than order.

Generating prime numbers may be done in a number of ways. For example, a random number be generated and tested for primality. Testing for primality may be done in a number of ways, e.g., by trial division, the AgrawalKayal-Saxena primality test, etc.

Alternatively, sieving methods may be used to generate a number of primes together. For example, the sieving may be used to generate all primes less than $k^2$. Sieving methods include the Sieve of Eratosthenes and variants, e.g., Sieve of Atkin, etc. Sieving method may be arranged to produce primes only in the interval $[k, k^2]$.

In an embodiment, the prime number unit is arranged to generate a prime number (p) such that the desired order (k) divides the prime number minus one (k|(p−1)). For example, the prime number unit may test a generated prime for this condition and if it is not satisfied generate a new prime modulus, until one does satisfy it. Alternatively, prime number unit 110 may generate integers of the form p=λk+1, and test them for primality. Such a prime will automatically satisfy the condition. The condition can be seen to be true by regarding the multiplicative group generated by the base element, which is of size k, but which is a subgroup of the multiplicative group modulo p (all non-zero elements), and which has p−1 elements. Verifying this condition will discard primes p for which the desired base element does not exist without needing to search for the base element. The vertical bar (|) indicates divisibility.

Generation device 100 comprises a base element unit 120. Once a suitable prime p has been found, the base element unit 120 searches for a corresponding base element.

Base element unit 120 is arranged to select a potential base element (u) larger than one, and smaller than the prime modulus minus one (p−1). This function of base element unit 120 has been illustrated with reference number 122. For example, the potential base element may be selected randomly. The potential base element may also be selected systematically, e.g., starting with potential base element 2.

Base element unit 120 is arranged to generate different powers of the potential base element ($u^0$, $u^1$, $u^2$, $u^3$, . . . , $u^{k-1}$). This function of base element unit 120 is illustrated with reference number 124. Generating different power may be done by generating all powers of the base element starting with exponent 1 and until the exponent equals the desired order k. Generating a powers includes computing a modulo operation modulo the prime modulus. For example, one may use the following formula $u^{i+1}=u^i*u \bmod p$ to iteratively generate powers.

Base element unit 120 is arranged to determine whether the potential base element (u) has an order equal to the desired order. This function of base element unit 120 has been illustrated with reference numeral 126. For example, base element unit 120 may verify whether $u^k=1 \bmod p$. The determining may use the generated power, computed using function 124. However, it is possible to compute the order faster, in about $\log_2(k)$ modular multiplications. In an embodiment, the order of u is computed first. For example, only if the order equals the desired order are the powers of base element generated. The latter takes about k modular multiplications.

Base element unit 120 is arranged to determine whether each ring-element may be expressed as a difference between two powers of the potential base element. This function of base element unit 120 is illustrated with reference numeral 128.

For example, function 128 may be implemented as follows. A list of integers modulo the prime modulus is generated. Associated with each integer there is associated a flag. The flag indicates whether the integer associated with the flag can be presented as a difference between powers of the potential base element. Initially, all flag are reset, i.e., indicate that the integer cannot be presented as a difference between powers of the potential base element.

Next, differences between two powers of the potential base element are generated and for each generated difference the flag associated with said difference is set. Differences are evaluated modulo the prime modulus. Generating the differences may generate all differences from the generated different powers of the potential base element. For example, the base element unit may evaluate all formulas $u^i - u^j$ modulo the prime modulus.

The latter may be optimized. In an embodiment, the list consists of the integers from 1 up to half the prime modulus minus one. In an embodiment, the list comprises at most half the integers from 1 up to the prime modulus minus one. This can be done since if an integer x can be expressed as $u^i - u^j$ then $-x$ can also be expressed in this manner, namely as $u^j - u^i$.

If the base element unit 120 finds that each ring-element may be expressed as a difference between two powers of the potential base element, a suitable ring and corresponding base element has been found. For example, device 100 may proceed to configure a calculation device with the modulus and base element.

In case the base element failed the test under 128, it may try again with a new prime number and/or potential base element. For example, device 100 may be arranged to iteratively generate a prime number and/or a potential base element at least until positively determining whether each ring-element may be expressed as a difference between two powers of the base element.

For example, device 100 may select a new potential base element among the integers between 2 and p−1 that has not yet been generated as a power of a previous potential base element for the same modulus. If all integers have been tried as a potential base element or have been generated as a power of a potential base element then a new modulus may be tried.

In a preferred embodiment, device 100 generates a comprehensive table comprising all prime number and base elements of order k modulo said prime number that allow obfuscated arithmetic, i.e., that allow all ring elements modulo the prime number to be written as a difference between powers of the base element.

Having a table of allowable prime numbers considerably speeds up the generation of non-prime moduli.

Figure 1B:
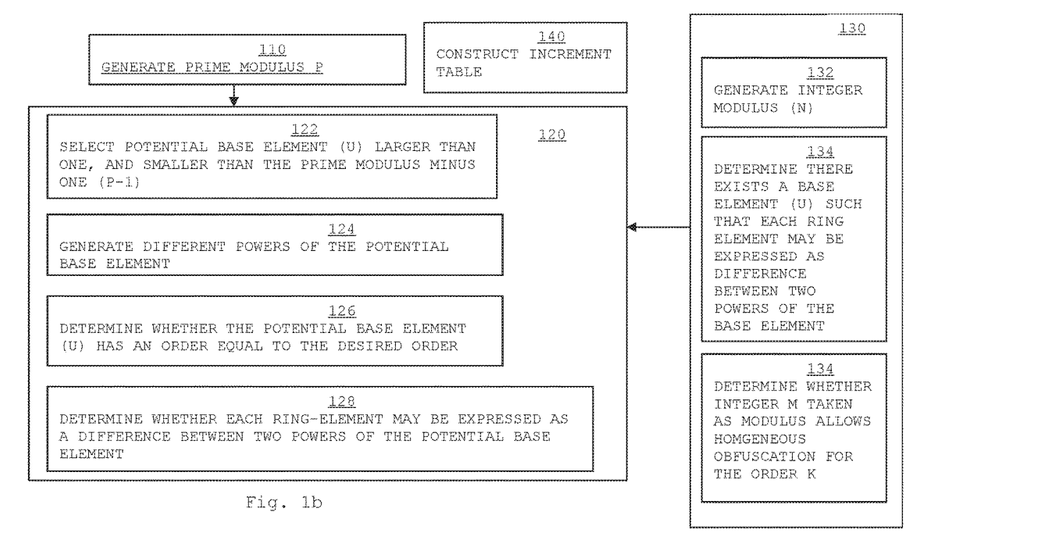

FIG. 1b schematically shows an example of an embodiment of an electronic generation device 101. Embodiments illustrated by FIG. 1b extend embodiments illustrated by FIG. 1a in that also non-prime moduli may be generated.

Device 101 contains the prime number unit 110 and base element unit 120 and additionally an integer unit 130. Like device 100, device 101 generates a modulus and a base element, such that the base element has a given desired order k. For example, device 101 may comprise an input for receiving the desired order. For example, device 101 may be configured for one or more specific orders.

Integer unit 130 is arranged to generate an integer modulus (n) such that the integer modulus is less than the square of the desired order (k; order(u)=k) of the base element ($k^2 > n$). Integer unit 130 may also be arranged so that the integer modulus (n) is at least the desired order of the base element ($n \geq k$). This function is illustrated in FIG. 1b with reference numeral 132.

Integer unit 130 is arranged to determine (134) that for a divisor of the integer modulus there exists a base element (u) such that each ring-element modulo the divisor may be expressed as a difference between two powers of the base element. For example, in an embodiment, integer unit 130 is arranged to determine using the base element unit that for each prime divisor of the integer modulus there exists a base element (u) such that each ring-element modulo the prime divisor may be expressed as a difference between two powers of the base element. This function is illustrated in FIG. 1b with reference numeral 134. In this application, if a first integer is a divisor of a second integer it implies that the first integer is a proper divisor.

It can be proven that if u is a valid base element for modulus n, then u mod p is a valid base element modulo p, for any prime divisor of n (p|n). Accordingly, if integer unit 130 determines that for some prime divisor of a modulus n, no base element exists, then consequently, there cannot exist a base element modulo n either. In fact this argument holds also for non-prime divisors, larger than 1 and smaller than the modulus n. If it has been established that each prime divisor of n allows a base element and homogenous obfuscation, then it may be verified that the modulus n itself allows each ring-element modulo the integer modulus (n) may be expressed as a difference between two powers of the potential base element. This operation may use the same procedure as described for function except using the integer modulus n instead of the prime modulus p. For example, the latter may comprise select a potential base element (u) larger than one, and smaller than the integer modulus minus one, generate different powers of the potential base element ($u^0, u^1, u^2, u^3, \ldots, u^{k-1}$), determine whether the potential base element (u) has an order equal to the desired order, and if so, determine whether each ring-element modulo the integer modulus may be expressed as a difference between two powers of the potential base element. If potential base element does not satisfy the latter condition a new potential base element may be selected, e.g., until all modulo the integer modulus have been tried or until all have been tried or have been generated as a power of a potential base element.

Thus in an embodiment of device 101, not only prime moduli are generated but also non-prime integer moduli. Device 101 may use device 100 for the prime divisors of n.

In an embodiment, of device 100 or 101, the prime number unit 120 is arranged to generate prime numbers (p) less than the square of the desired order ($k^2$), and to determine using the base element unit whether each ring-element may be expressed as a difference between two powers of the potential base element. Having a table available of prime that allow homogenous obfuscation using a base element of order k, considerably speeds of the search for integer moduli that allow homogenous obfuscation using a base element of order k.

An embodiment using a sieving method to generate integer moduli allowing homogenous obfuscation using a base element of order k is as follows.

prime unit 110 and base element unit 120 generate the smallest prime $p_1$ larger than k that allows homogenous obfuscation using a base element of order k.

integer unit 130 generates a list of integers larger or equal to $p_1$ and smaller than $k^2$, each with an associated flag. The flags are initially set to indicate that they may allow homogenous obfuscation using a base element of order k. Set an index into the list to the smallest integer larger than $p_1$.

generate prime numbers smaller than $p_1$ and reset the flags associated to integers on the list that are a multiple of said smaller prime numbers.

(A) determine the smallest integer m on the list with an index larger or equal to the index for which the flag is set.

Determine, e.g., using function 136 whether the integer m taken as a modulus allows homogenous obfuscation for the order k.
  if not reset the flag associated to m, and reset all flag of integers on the list which are a multiple of m
increment the index. If the index still points within the list continue at (A).

Once a suitable modulus and base element has been found, the electronic generation device 100 or 101 may proceed to compute an increment table for use in a calculating device for performing obfuscated arithmetic in a commutative ring ($\mathbb{Z}_n$), e.g., using an optional table creation unit 140.

The table creation unit is arranged to construct an increment table. For example, table creation unit 140 may be arranged to
  repeatedly select an input ring element, e.g., a residue class modulo the modulus,
  determine an output ring element that equals an increment ring element ring-added to the input ring element
  determine an output integer-list encoding for the output ring element,
  add an entry to the increment table, mapping the input ring element to the output integer-list
More details regarding table construction are given in said previous application.

Generation device 100 or 101 may be arranged to generate a table, e.g., a comprehensive table, giving some or all prime and/or all integers that allow homogenous obfuscation for the order k, but this is not necessary. Instead generation device 100 or 101 may be arranged to generate iteratively generate moduli and/or a potential base element until positively determining whether each ring-element may be expressed as a difference between two powers of the base element.

Typically, the devices 100 and 101 each comprise a microprocessor (not shown) which executes appropriate software stored at the devices 100 and 101; for example, that software may have been downloaded and/or stored in a corresponding memory, e.g., a volatile memory such as RAM or a non-volatile memory such as Flash (not shown). Alternatively, the devices 100 and 101 may, in whole or in part, be implemented in programmable logic, e.g., as field-programmable gate array (FPGA). Devices 100 and 101 may be implemented, in whole or in part, as a so-called application-specific integrated circuit (ASIC), i.e. an integrated circuit (IC) customized for their particular use.

The functions 122, 124, 126, 128, 132, 134, 136 may be implemented as corresponding function units.

In an embodiment, the electronic generation device comprises a prime number circuit, a base element circuit and optionally an integer circuit. The electronic generation device may comprise function circuits corresponding to the function units. The circuits are arranged for the corresponding function of the unit. The circuits may be a processor circuit and storage circuit, the processor circuit executing instructions represented electronically in the storage circuits. The circuits may also be, FPGA, ASIC or the like.

An electronic generation device is arranged to generate parameters for digital obfuscated arithmetic, the parameters defining a commutative ring having a finite number of ring-elements, a base element being comprised in the ring elements, such that each ring-element may be expressed as a difference between two powers of the base element, the generation device being arranged to generate a modulus less than the square of a desired order of the base element, select a potential base element larger than one, and smaller than the modulus minus one, generate different powers of the potential base element, determine whether the potential base element has an order equal to the desired order, and if so, determine whether each ring-element may be expressed as a difference between two powers of the potential base element.

Figure 2:
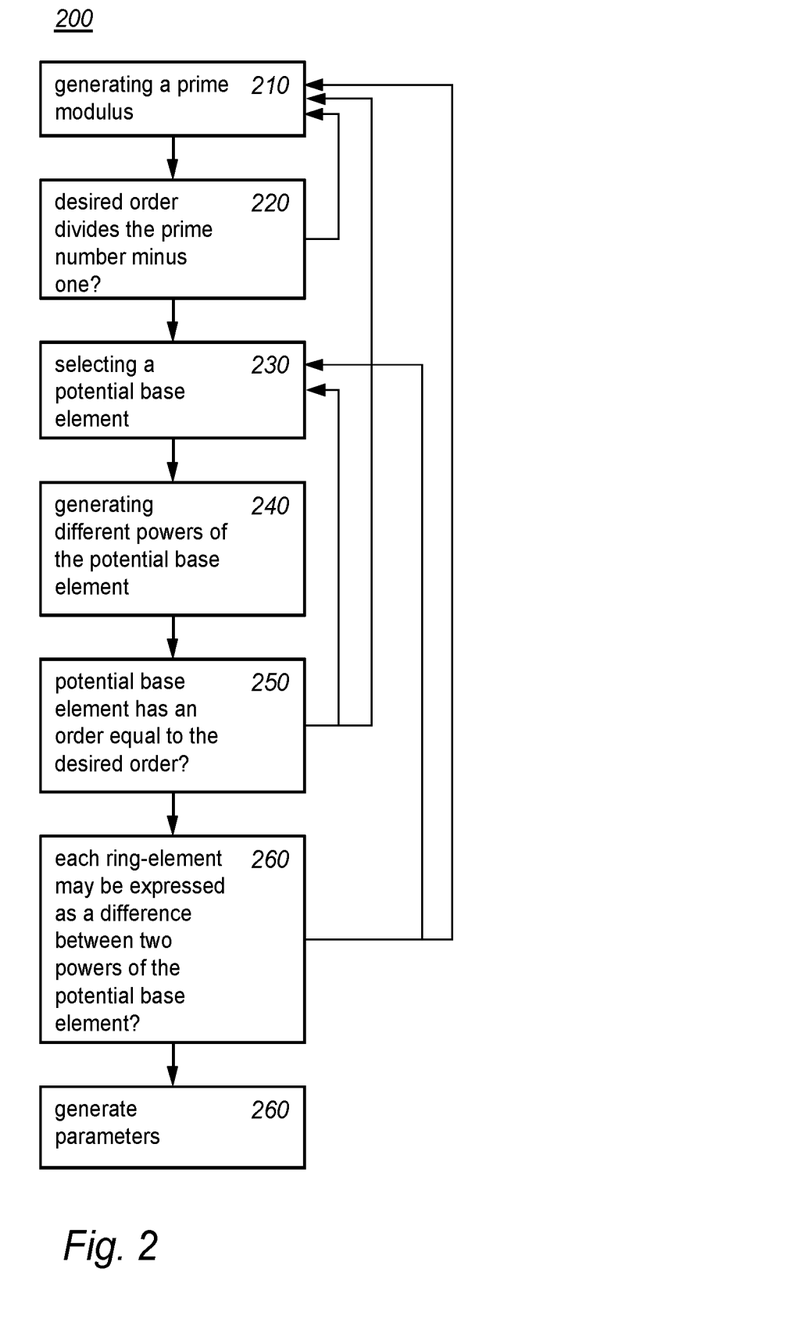

FIG. 2 schematically shows an example of an embodiment of an electronic generation method 200. Electronic generation method 200 is arranged to generate parameters for digital obfuscated arithmetic. The parameters define a commutative ring having a finite number of ring-elements. A base element (u) is comprised in the ring elements, such that each ring-element may be expressed as a difference between two powers of the base element.

Generation method 200 comprises
Generating 210 a prime modulus (p) such that the prime modulus is less than the square of a desired order (k; order(u)=k) of the base element ($k^2 > p$), and
Verifying 220 that the desired order (k) divides the prime number minus one (k|(p−1)).
Selecting 230 a potential base element (u) larger than one, and smaller than the modulus minus one,
Generating 240 different powers of the potential base element ($u^0, u^1, u^2, u^3, \ldots, u^{k-1}$),
Determining 250 whether the potential base element (u) has an order equal to the desired order, and if so,
Determining 260 whether each ring-element may be expressed as a difference between two powers of the potential base element.

Once a modulus and base element have been found method 200 may generate 270 parameters including the prime number and the base element, if it is determined that each ring-element may be expressed as a difference between two powers of the base element.

Method 200 iteratively generates a prime number and/or a potential base element at least until positively determining whether each ring-element may be expressed as a difference between two powers of the base element. This has been indicated in FIG. 2 by arrows pointing back in the flow chart. For example, if the test of 220, 250, or 260 fails, the method may continue the generation, e.g., the search at the generation of a prime modulus or of the selection of a base element.

Figure 3:
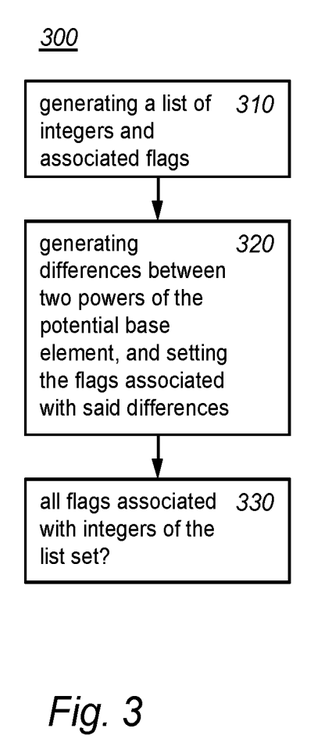

FIG. 3 schematically shows an example of an embodiment of an electronic method 300 verifying whether each ring-element may be expressed as a difference between two powers of the potential base element. The method may be used for ring-element modulo an integer modulus, in particular modulo a prime modulus.

Method 300 comprises
Generating 310 a list of integers and associated flags,
Generating 320 differences between two powers of the potential base element, and setting the flags associated with said differences,
Determining 330 that each ring-element may be expressed as a difference between two powers of the potential base element if all flags associated with integers of the list are set.

Figure 4:
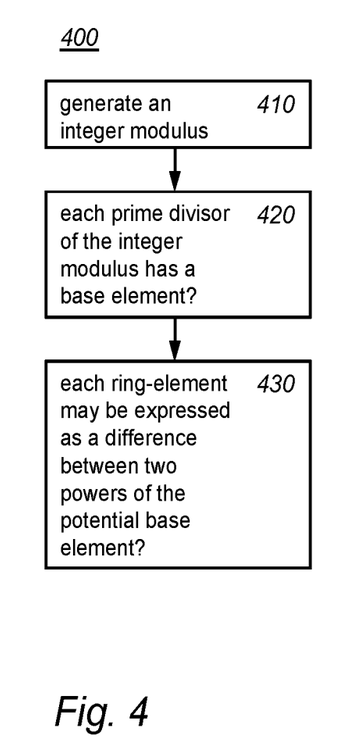

FIG. 4 schematically shows an example of an embodiment of an electronic generation method 400. Method 400 comprises
Generating 410 an integer modulus (n) such that the modulus is less than the square of the desired order (k; order(u)=k) of the base element ($k^2 > n$),
Determining 420 using the base element unit that for each prime divisor of the modulus there exists a base element (u) such that each ring-element modulo the prime divisor may be expressed as a difference between two powers of the base element, Determining 430 whether each ring-element modulo the integer modulus (n) may be expressed as a difference between two powers of the potential base element.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 240 and 260 may be executed, at least partially, in parallel. For example, step 250 may be executed before step 240. Moreover, a given step may not have finished completely before a next step is started.

A method according to an embodiment may be executed using software, which comprises instructions for causing a processor system to perform method 200, 300 or 400. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server. A method may be executed using a bitstream arranged to configure programmable logic, e.g., a field-programmable gate array (FPGA), to perform the method.

It will be appreciated that an embodiment also extends to computer programs, particularly computer programs on or in a carrier, adapted for putting an embodiment into practice. The program may be in the form of source code, object code, a code intermediate source and object code such as partially compiled form, or in any other form suitable for use in the implementation of the method according to an embodiment. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

Figure 5A:
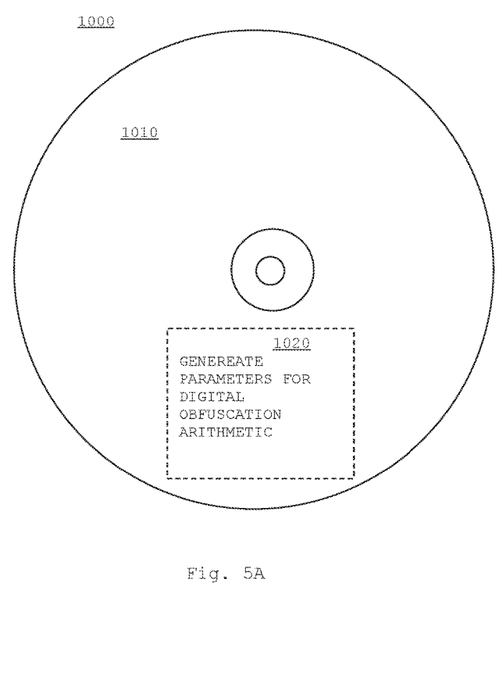
FIG. 5a shows a computer readable medium having a writable part comprising a computer program according to an embodiment.

FIG. 5a shows a computer readable medium 1000 having a writable part 1010 comprising a computer program 1020, the computer program 1020 comprising instructions for causing a processor system to perform a method of generating parameters for digital obfuscated arithmetic, according to an embodiment. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said method.

Figure 5B:
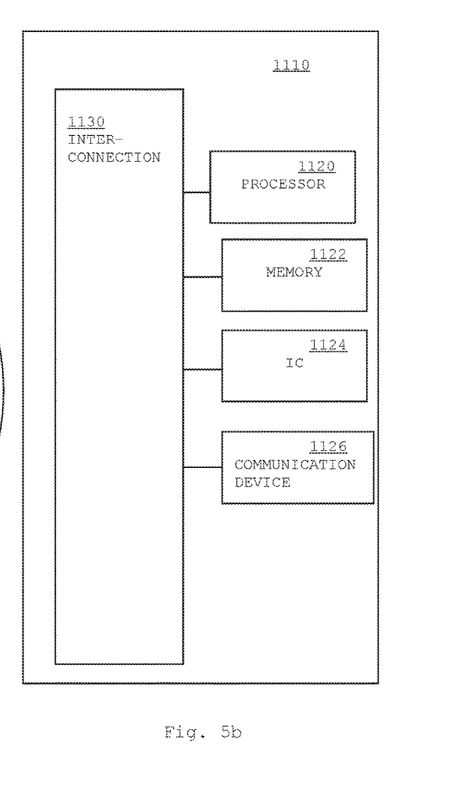
FIG. 5b shows a schematic representation of a processor system according to an embodiment.

FIG. 5b shows a schematic representation of a processor system 1100 according to an embodiment. The processor system comprises one or more integrated circuits 1110. The architecture of the one or more integrated circuits 1110 is schematically shown in FIG. 7b. Circuit 1110 comprises a processing unit 1120, e.g. a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

In the claims references in parentheses refer to reference signs in drawings of embodiments or to formulas of embodiments, thus increasing the intelligibility of the claim. These references shall not be construed as limiting the claim.

The invention claimed is:

1. An electronic generation device arranged to generate parameters for digital obfuscated arithmetic, the parameters defining a commutative ring ($\mathbb{Z}_n$) having a finite number of ring-elements, a base element (u) being comprised in the ring elements, such that each ring-element may be expressed as a difference between two powers of the base element ($u^{a_1} - u^{a_2}$), the generation device comprising
 a prime number circuit arranged to generate a prime modulus (p) such that the prime modulus is less than the square of a desired order (k; order(u)=k) of the base element ($k^2 = p$),
 a base element circuit arranged to
  select a potential base element (u) larger than one, and smaller than the prime modulus minus one,
  generate different powers of the potential base element ($u^0, u^1, u^2, u^3, \ldots, u^{k-1}$),
  determine whether the potential base element (u) has an order equal to the desired order, and if so,
  determine whether each ring-element modulo the prime modulus may be expressed as a difference between two powers of the potential base element, and
 a table creation circuit arranged to construct an increment table for performing obfuscated arithmetic by adding an entry to the increment table when it is determined that a ring-element modulo the prime modulus may be expressed as the difference between two powers of the potential base element.

2. The electronic generation device as in claim 1, wherein the prime number circuit is arranged to generate a prime number (p) such that the desired order (k) divides the prime number minus one (k|(p−1)).

3. The electronic generation device as in claim 1, arranged to generate parameters including the prime number and the base element, if it is determined that each ring-element may be expressed as a difference between two powers of the base element.

4. The electronic generation device as in claim 1, wherein the prime number circuit is arranged to generate all prime numbers (p) less than the square of the desired order, and to determine using the base element unit whether each ring-element may be expressed as a difference between two powers of the potential base element.

5. The electronic generation device as in claim 1, arranged to iteratively generate a prime number and/or a potential base element at least until positively determining whether each ring-element may be expressed as a difference between two powers of the base element.

6. The electronic generation device as in claim 1, wherein determining whether each ring-element may be expressed as a difference between two powers of the potential base element comprises
generating a list of integers modulo the prime modulus and associated flags,
generating differences between two powers of the potential base element, and setting the flags associated with the differences,
determining that each ring-element may be expressed as a difference between two powers of the potential base element if all flags associated with integers of the list are set.

7. The electronic generation device as in claim 6, wherein the list consists of the integers from 1 up to half the prime modulus minus one.

8. The electronic generation device as in claim 1, comprising
an integer circuit arranged to
generate an integer modulus (n) such that the integer modulus is less than the square of the desired order (k; order(u)=k) of the base element ($k^2 > n$),
determine that for a divisor of the integer modulus there exists a base element (u') such that each ring-element modulo the divisor may be expressed as a difference between two powers of the base element (u'), and
if so, determine whether each ring-element modulo the integer modulus (n) may be expressed as a difference between two powers of the potential base element (u).

9. The electronic generation device as in claim 1, arranged to compute the increment table for use in a calculating device for performing obfuscated arithmetic in the commutative ring ($\mathbb{Z}_n$),
the table creation circuit being arranged to
repeatedly select an input ring element,
determine an output ring element that equals an increment ring element ring-added to the input ring element
determine an output integer-list encoding for the output ring element,
add an entry to the increment table, mapping the input ring element to the output integer-list.

10. The electronic generation device as in claim 1, comprising an interface arranged to receive the desired order before generating the prime modulus or integer modulus.

11. An electronic generation method arranged to generate parameters for digital obfuscated arithmetic, the parameters defining a commutative ring having a finite number of ring-elements, a base element (u) being comprised in the ring elements, such that each ring-element may be expressed as a difference between two powers of the base element, the generation method performed by a electronic generation circuit comprising
generating a prime modulus (p) such that
the prime modulus is less than the square of a desired order (k; order(u)=k) of the base element ($k^2 > p$),
selecting a potential base element (u) larger than one, and smaller than the modulus minus one,
generating different powers of the potential base element ($u^0, u^1, u^2, u^3, \ldots, u^{k-1}$),
determining whether the potential base element (u) has an order equal to the desired order, and when so,
determining whether each ring-element may be expressed as a difference between two powers of the potential base element, and
constructing an increment table for performing obfuscated arithmetic by adding an entry to the increment table when it is determined that a ring-element modulo the prime modulus may be expressed as the difference between two powers of the potential base element.

12. The method performed by an electronic generation circuit as in claim 11, comprising
generating an integer modulus (n) such that the integer modulus is less than the square of the desired order (k; order(u)=k) of the base element ($k^2 > n$),
determining that for a divisor of the integer modulus there exists a base element (u') such that each ring-element modulo the divisor may be expressed as a difference between two powers of the base element (u'), and
when so, determining whether each ring-element modulo the integer modulus (n) may be expressed as a difference between two powers of the potential base element (u).

13. A computer-readable non-transitory medium having stored a computer program comprising computer program code adapted to perform an electronic generation method to generate parameters for digital obfuscated arithmetic, the parameters defining a commutative ring having a finite number of ring-elements, a base element (u) being comprised in the ring elements, such that each ring-element may be expressed as a difference between two powers of the base element when the computer program is run on a computer, the generation method comprising
generating a prime modulus (p) such that
the prime modulus is less than the square of a desired order (k; order(u)–k) of the base element ($k^2 > p$),
selecting a potential base element (u) larger than one, and smaller than the modulus minus one,
generating different powers of the potential base element ($u^0, u^1, u^2, u^3, \ldots, u^{k-1}$),
determining whether the potential base element (u) has an order equal to the desired order, and if so,
determining whether each ring-element may be expressed as a difference between two powers of the potential base element, and
construction an increment table for performing obfuscated arithmetic by adding an entry to the increment table when it is determined that a ring-element modulo the prime modulus may be expressed as the difference between two powers of the potential base element.

14. A processor circuit adapted to perform an electronic generation method to generate parameters for digital obfuscated arithmetic, the parameters defining a commutative ring having a finite number of ring-elements, a base element (u) being comprised in the ring elements, such that each ring-element may be expressed as a difference between two powers of the base element, the generation method comprising generating a prime modulus (p) such that
the prime modulus is less than the square of a desired order (k, order(u)=k) of the base element ($k^2>p$),
selecting a potential base element (u) larger than one, and smaller than the modulus minus one,
generating different powers of the potential base element ($u^0, u^1, u^2, u^3, \ldots, u^{k-1}$),
determining whether the potential base element (u) has an order equal to the desired order, and if so,
determining whether each ring-element may be expressed as a difference between two powers of the potential base element, and
storing an increment table for performing obfuscated arithmetic by adding an entry to the increment table when it is determined that a ring-element modulo the prime modulus may be expressed as the difference between two powers of the potential base element.

* * * * *